United States Patent [19]

Senecal

[11] 3,889,378
[45] June 17, 1975

[54] BRAKE DRUM AND DISC MICROMETER

[75] Inventor: William J. Senecal, Monson, Mass.

[73] Assignee: Gulf & Western Manufacturing Company, New York, N.Y.

[22] Filed: June 28, 1973

[21] Appl. No.: 374,684

[52] U.S. Cl. ............... 33/143 R; 33/164 D; 33/159; 33/180 AT
[51] Int. Cl. ............................................. G01b 5/02
[58] Field of Search .......... 33/143 R, 147 K, 178 R, 33/180 AT, 164 C, 164 D, 147 T, 147 J, 147 G, 159, 163, 165, 158, 164 R, 178 D

[56] References Cited
UNITED STATES PATENTS

| | | | |
|---|---|---|---|
| 495,019 | 4/1893 | Carter et al. | 33/164 C |
| 536,676 | 4/1895 | Wilcox | 33/167 |
| 1,596,542 | 8/1926 | Kaseberg | 33/164 D |
| 2,769,241 | 11/1956 | Barrett | 33/147 K |
| 3,745,661 | 7/1973 | Atzberger | 33/147 J |

Primary Examiner—Richard E. Aegerter
Assistant Examiner—Willis Little
Attorney, Agent, or Firm—McCormick, Paulding & Huber

[57] ABSTRACT

A micrometer for measuring the inside diameter of brake drums and the thicknesses of brake discs includes a calibrated rod and a fixed sleeve member rigidly attached to one end of said rod. An adjustable contact pin having a machined contact surface at both ends is threadably engaged in the fixed sleeve member and is translatably mounted in a manually rotated dial. Calibrations on the dial correspond to the amount of linear movement experienced by the contact pin when the dial is rotated. A movable sleeve is also mounted on the calibrated rod and carries a set screw for positioning the sleeve on the rod by engaging one of a row of regularly spaced holes drilled in the rod for this purpose. Fixed contact pins carried by the movable sleeve are mounted in axial alignment with the adjustable contact pin on the fixed sleeve and point in opposite directions with respect to each other. Two sets of calibrations on the rod are in registry with the regularly spaced holes and correspond to the distances between the inner and outer contact surfaces of the adjustable and fixed contact pins. Inside or outside distances may thus be measured by first adjusting the calibrated dial to zero, placing the appropriate fixed contact pin in abutting relation to the workpiece, adjusting the movable sleeve to the closest corresponding calibration on the rod and then rotating the calibrated dial to bring the inside or outside contact surface of the adjustable contact pin into engagement with the workpiece.

5 Claims, 3 Drawing Figures

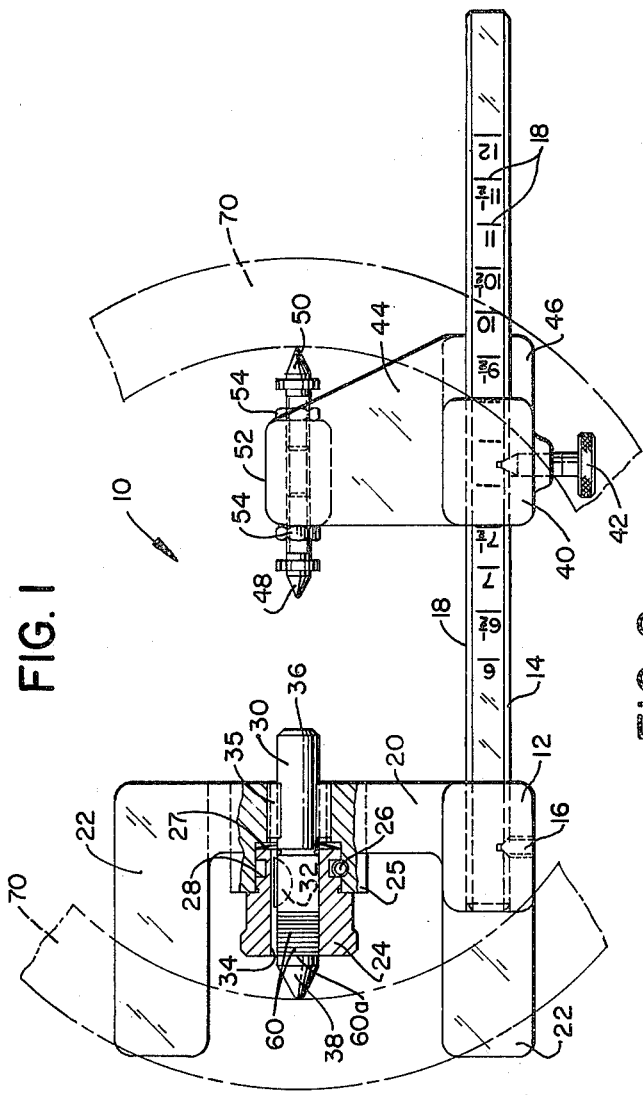
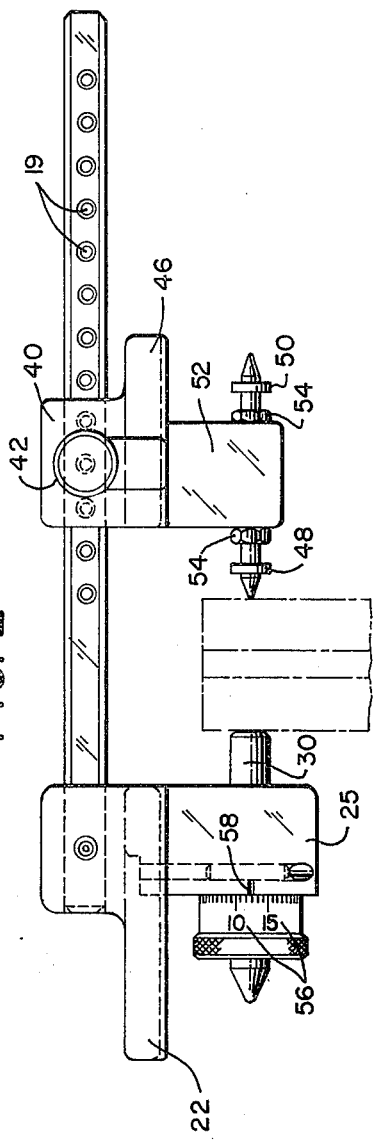
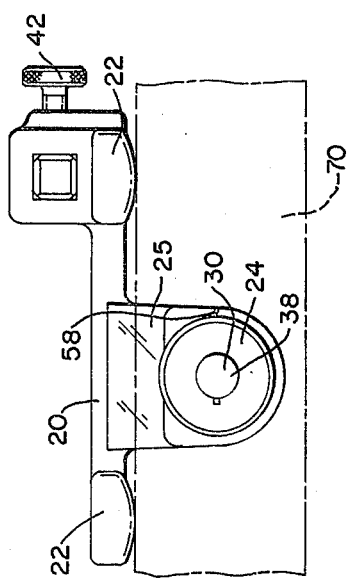
FIG. 1
FIG. 2
FIG. 3

3,889,378

BRAKE DRUM AND DISC MICROMETER

BACKGROUND OF THE INVENTION

This invention relates to micrometers and more particularly to a micrometer especially suited for measuring both the inside diameter of brake drums and the thickness of brake discs.

Typical automotive brake drums are repaired by machining the inside diameter to obtain a new surface thereon. On the other hand, automotive brake discs are resurfaced by maintaining their outside parallel faces. It is necessary therefore, during the repair procedure to provide some means for measuring both the inside diameter of brake drums and also the thickness of break discs before and after machining operations.

The usual method employed in measuring the inside diameter of brake drums utilizes a micrometer consisting of two movable sleeves adjustably mounted on a calibrated rod. These sleeves are adjusted to a predetermined dimension and then placed in contact with the surfaces to be measured. A vernier scale on one of the sleeves is then used to determine whether the inside diameter is oversized or undersized and to what extent.

To measure the distance between parallel faces of a brake disc, it is necessary to employ a different type of micrometer. This is the typical inside type of micrometer which comprises a fixed contact pin or anvil and a movable contact pin which may be adjusted relative to the anvil by a calibrated dial. The thickness of the disc is thus measured by placing the fixed contact pin in engagement with one disc face and adjusting the movable contact pin into engagement with the opposite face.

The present invention seeks to eliminate the need for the two different types of micrometers presently required for the repair of automotive brakes. In its preferred embodiment, this invention incorporates the characteristics of both the outside and inside micrometers described above. It may thus be used with equal facility to measure the inside dimensions of a brake drum or the distances between the outside surfaces of a brake disc. The method of operating the proposed device is basically the same for both inside and outside measurements and therefore the device has the added advantage of requiring no modifications to its structure when changing from one measuring operation to the other.

SUMMARY OF THE INVENTION

This invention resides in a brake drum and disc micrometer which comprises a calibrated rod and fixed sleeve rigidly attached to one end thereof. This sleeve has an integral arm portion which projects perpendicularly relative to the calibrated rod and which provides support for an adjustable contact pin which is threadably mounted in the fixed sleeve. This contact pin is mounted parallel relative to the calibrated rod and has machined contact surfaces at both ends. The adjustable contact pin is translatably mounted by means of a key in a calibrated dial. This dial is in turn rotatably mounted in the arm portion of the fixed sleeve. Thus, when the dial is rotated, the contact pin is moved axially in a direction parallel to the calibrated rod. Calibrations on the dial correspond directly to the amount of movement of the contact pin associated with the rotation of the dial.

A movable sleeve is adjustably mounted on the calibrated rod and may be held in adjusted positions thereon by a set screw which is engaged with one of a row of regularly spaced holes in the rod. These holes correspond to the sets of calibrations on the rod which in turn denote the distances between inner and outer contact surfaces of the adjustable and fixed contact pins. The movable sleeve also includes an integral arm portion which projects perpendicularly relative to the calibrated rod. A pair of fixed contact pins are attached to opposite sides of the movable sleeve arm portion parallel to the calibrated rod and in axial alignment with the adjustable contact pin on the fixed sleeve.

The device may be used to measure the inside dimensions of a brake drum by first setting the calibrated drum on the fixed sleeve to zero and then adjusting the movable sleeve to the calibration on the appropriate scale on the rod which most closely corresponds to the inside dimension of the brake drum. The outer contact pin on the adjustable sleeve is then placed in abutting relation to the inner surface of the brake drum and the calibrated drum on the fixed sleeve is rotated until the outer contact surface of the adjustable contact pin is also brought into contact with the inner surface of the brake drum.

The procedure for measuring the distance between the parallel outside faces of a brake disc is the same as that just described except that the inner contact pin on the adjustable sleeve and the inner contact surface of the adjustable contact pin are placed in abutting relation to the outer surfaces of the brake disc.

BRIEF DESCRIPTION OF THE DRAWINGS

FIG. 1 is a top plan view of the preferred embodiment illustrating the positioning of the device on a brake drum partially shown in phantom.

FIG. 2 is a side view of the device shown in FIG. 1 illustrating the positioning of the device on a brake disc partially shown in phamtom.

FIG. 3 is an end view of the device shown in FIGS. 1 and 2.

DETAILED DESCRIPTION OF THE PREFERRED EMBODIMENT

A typical application of a micrometer incorporating the present invention is indicated generally at 10 in FIG. 1. A fixed sleeve 12 is rigidly attached to one end of a rod 14 by means of a set screw 16. The rod 14 includes two sets of calibrations 18 inscribed along its length and a row of regularly spaced holes 19 corresponding to these calibrations. The function of these calibrations and holes is explained further along in this application.

As shown, the fixed sleeve 12 includes a laterally projecting arm portion 20 and shelf portion 22. A calibrated dial 24 is rotatably mounted on a boss 25 which depends normally from the projecting arm portion 20 by a pin 26 which passes through the boss 25 and engages a groove 28 in the dial 24. The dial is biased into frictional engagement with the pin 26 by a conical spring 27 which is inserted between the dial and the boss 25 and which forces the dial outwardly into engagement with the pin. This frictional engagement retards the rotation of the dial permitting semipermanent settings.

An adjustable contact pin 30 is threaded into the boss 25 and passes through the dial 24. This pin 30 is rotated by the dial 24 through the medium of a key 32 mounted in the pin and slidably retained in the groove 34 in the dial 24. Thus the pin 30 is permitted to move axially through the dial as it is rotated through a screw thread insert 35 in the boss 25. This contact pin 30 includes a flat machined contact surface 36 at its inner end and a conical machined contact surface 38 at its outer end. The different shapes of these two surfaces is a function of their different applications. The outer conical surface is used to engage a curved surface, namely the inner face of a brake drum while the flat contact surface of the pin is used to engage the similarly flat surface of a brake disc. Obviously, the pin is of known length, which in a presently preferred construction is 3⅛ inches.

A movable sleeve 40 is adjustably mounted on the calibrated rod 14 and may be firmly positioned thereon in spaced relation to the fixed sleeve 12 by means of a set screw 42. This is accomplished by selectively engaging the set screw with one of the previously mentioned holes 19 which correspond to an appropriate calibration 18. At this point it should be noted that the calibrations 18 visible in FIG. 1 comprise an "inch" scale for reference in measuring the inside dimension or diameter of a brake drum. The calibrations are at half-inch intervals to cover a range of from 6 inches to 12 inches. The holes or set screw sockets 19 are also spaced ½ inch apart, and the sleeve 40 is shown located on the rod by the set screw 42 to measure the inside dimension of a brake drum whose I.D. is not less than 7½ inches and no greater than 8 inches, this being indicated by the 7½ mark being visible at the left-hand edge of the sleeve 40. A second set of calibrations or scale 18 is provided on the surface of rod 14 facing the parallel contact pin 30. This is also an "inch" scale covering from 0 to 1½ inches for reference in measuring the over-all thickness of brake discs. The 0 calibration corresponds to the 6 calibration on the visible scale in FIG. 1 and the 1½ calibration corresponds to 7½ calibration on the scale in view. Thus, in the position shown for the sleeve 40, a brake disc can be measured accurately if its thickness is not less than 1½ inches and not greater than 2 inches.

Like the fixed sleeve 12, the adjustable sleeve 40 also includes a projecting arm portion 44 and a shelf portion 46. Inner and outer fixedly located contact pins 48 and 50, respectively, are threaded into the end of the projecting arm portion 44 on a normally depending boss 52, as shown. These pins are locked in threaded position by jam nuts 54, 54 to provide a known, predetermined spacing between their tips, 2 7/8 inches in the presently preferred construction referred to. The said contact pins 48 and 50 are axially aligned with the threaded contact pin 22 carried by the fixed sleeve 12.

As shown in FIG. 2, the dial 24 includes a number of equally spaced calibrations 56 engraved in its surface comprising a vernier scale from 0 to 50. These calibrations 56 correspond to the axial movement of the adjustable contact pin 30 and indicate the amount of axial movement associated with the rotation of the dial 24. The calibrations 56 are read in conjunction with an indicator groove 58 machined in the top surface of the boss 25 and a number of axially spaced grooves 60 engraved around the circumference of the pin 30. The grooves 60 are spaced, according to the practical preferred construction mentioned, 0.050 inches apart and each groove represents the axial movement of the contact pin 30 corresponding to one complete revolution of the dial 24. The vernier scale calibrations 56 then indicate the fractional part of the distance between each of the grooves 60 to 0.001 of an inch.

The contact pin 30 as illustrated, is shown in its "zero" position. That is, the outermost groove 60a is in registry with the face of the dial 24 and the zero calibration 56 is in registry with the indicator groove 58. In this position, the distance between the tip of the outer conical surface 38 and the tip of the outer stationary contact pin 50 corresponds exactly to the 7½ inch calibration appearing adjacent to the inner edge of the movable sleeve 40.

The device is utilized to measure the inner diameter of a brake drum in the following manner. The adjustable contact pin 30 is first set in its zero position and then the movable sleeve 40 is adjusted on the rod 14 to that calibration which most closely approximates the diameter to be measured. The device is then positioned on the brake drum by resting the shelf portions 22 and 46 of the fixed and movable sleeves on the brake drum rim with the outer stationary contact pin 50 in engagement with the inner brake surface. A typical brake drum is illustrated in phantom in FIGS. 1 and 3 as 70. With the device in position, the adjustable contact pin 30 may then be moved into engagement with the inner brake drum surface by rotating the dial 24. The final dimension is then obtained by adding the vernier scale reading to the reading on the brake drum scale on the rod 14.

The procedure for measuring brake discs is similar to that described above. With the adjustable contact pin 30 set in its zero position, the movable sleeve 40 is adjusted on the rod 14 to that calibration closest to the distance between the parallel faces of the brake disc. The adjustable contact pin 30 is then advanced until the brake disc workpiece fits between the flat contact surface 30 of the adjustable contact pin and the point of the fixed contact pin 48. The adjustable contact pin 30 may then be retracted to place both contact pins in abutting relation to the opposite faces of the disc. The final dimension is then obtained by adding the vernier scale reading to the reading on the brake disc scale on the rod 14.

An important consideration in the preferred construction shown wherein the brake drum scale starts with 6 inches and the brake disc scale starts with 0 inches resides in the relative location of the contact pins 30, 48 and 50. That is, with the dial 24 set at 0 and with the movable sleeve 40 located with reference to the 0 inch calibration on the brake disc scale, the end of the pin 48 must contact the end 36 of the pin 30 for a proper "zero" reading. At the same time, the end of the pin 50 must be separated from the end 38 of the pin 30 by just six inches in order for a proper 6 inch reading on the brake drum scale. This is accomplished in the preferred construction mentioned wherein the length of the pin 30 is 3⅛ inches and the distance separating the contact tips on the pins 48 and 50 is 2 7/8 inches.

I claim:

1. A brake drum and disc micrometer comprising an elongated rod, means fixedly secured to said rod and having an arm extending therefrom, first contact pin means movably supported in said arm parallel to said rod and having an outer end for engaging the inner surface of a brake drum and an inner end for engaging the outer surface of a brake disc, calibrated means for axially adjusting said pin means in said arm and for indicating the extent of movement thereof from a normal or "zero" position relative to the arm, a sleeve supported on said rod for movement thereon to predetermined fixed positions and having an arm extending therefrom, second contact pin means fixedly secured to the last mentioned arm in axial alignment with the first pin means and also having outer and inner ends for contacting the inner and outer surfaces of brake drums and discs respectively, the total length of said two contact pin means being known, the said rod is provided with a pair of calibrated scales along its length for reading brake disc thickness and brake drum inside diameter respectively with reference to the position of the sleeve on the rod, the disc thickness scale having a starting calibration indicative of the predetermined distance apart of the inner ends of the two contact pin means at one predetermined fixed position of the sleeve and with the first contact pin means set at its calibrated "zero" position, and the drum diameter scale having a coincident starting calibration which is larger than the starting calibration on the disc scale by the said known total length of said contact pin means.

2. A micrometer as defined in claim 1 wherein said first contact pin means comprises a single pin threaded into its associated arm, and the means for axially adjusting said first contact pin means comprises a cylindrical dial around the pin rotatably supported in said associated arm and having peripheral calibrations referenced to a point on said associated arm.

3. The micrometer of claim 2 and wherein said contact pin comprising the first pin means has an axial series of calibrations provided thereon corresponding to the said dial cylinder whereby a vernier reading is provided in combining the visible calibrations on said first pin means with the dial calibrations referenced to said point on said associated arm.

4. The drum and disc micrometer as set forth in claim 1 wherein both of said arms are adapted to rest on the rim of a brake drum while supporting the first and second contact pin means for engagement with the inner surface of the drum in diametrically opposed locations.

5. The micrometer of claim 1 wherein the second contact pin means comprises a pair of pins threaded into the sleeve arm to extend in opposite directions, and wherein means are provided to retain the said pair of pins against axial movement after they have been located in preselected positions in said sleeve arm.

* * * * *